Jan. 15, 1935.    F. W. JACKSON    1,988,420
INSULATION AND PROCESS OF MAKING THE SAME
Original Filed Oct. 15, 1931
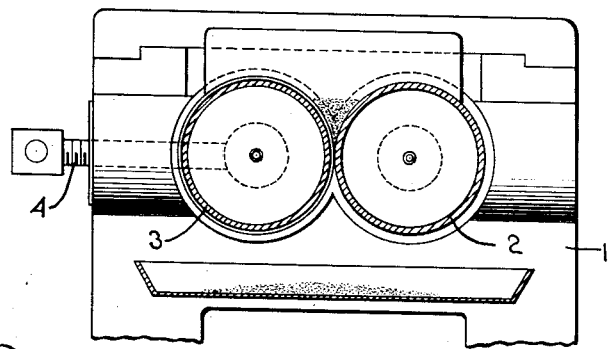
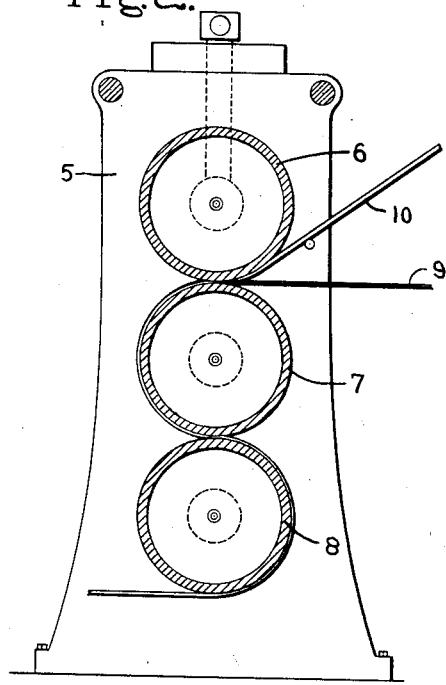
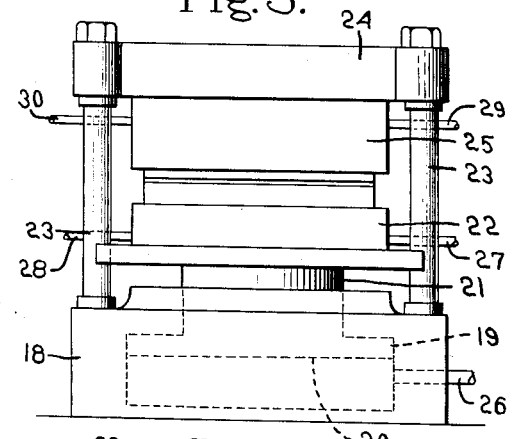
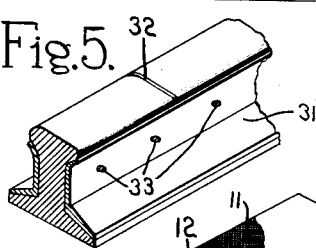
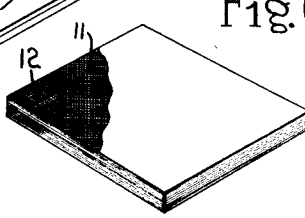
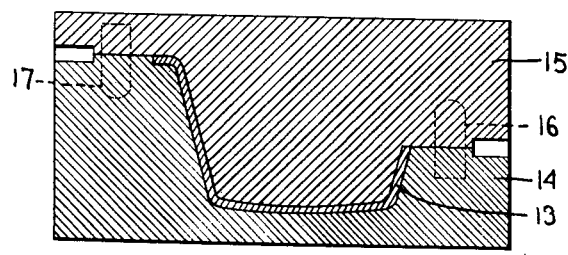
Inventor.
Frank W. Jackson
by Heard Smith & Tennant.
Attys.

Patented Jan. 15, 1935

1,988,420

UNITED STATES PATENT OFFICE 1,988,420

INSULATION AND PROCESS OF MAKING THE SAME

Frank W. Jackson, Revere, Mass., assignor to Irving G. Sigilman, Dorchester, Mass.

Application October 15, 1931, Serial No. 569,018
Renewed October 25, 1934

6 Claims. (Cl. 154—2.6)

This invention relates to improvements in insulation and the object of the invention is to provide a waterproof electric and heat insulating material which is resistant to acids and also to alkalis, which can be molded and which is infrangible, or in other words, an insulating material of extreme efficiency and durability.

The invention also comprises the process of making such insulating material.

The insulating material forming the subject matter of the present invention in its broad sense comprises a waterproof electric and heat insulating material resistant to acids and alkalis comprising a plurality of relatively thin superimposed layers of fabric having the interstices of the fabric and of the fibres thereof completely filled with a compacted rubber composition and cohesively compacted and vulcanized to provide a hard, rigid and infrangible body.

The process of producing the insulation forming the subject matter of the invention comprises broadly homogeneously mixing into rubber, preferably a combination of rubbers of different character, while subjected to heat and in succession, a mineral wax, a heat-resistant filler, lime and sulphur to provide a vulcanizable plastic composition, frictioning the composition preferably into one side of a sheet of heavy woven fabric, such as duck, to fill completely the interstices thereof without substantially increasing the thickness of the sheet, superimposing a plurality of layers of impregnated fabric, preferably with the direction of the warps of adjacent layers disposed in angular relation to each other, subjecting the superimposed layers to pressure and heat to cause the impregnated layers to be cohesively compacted in such a manner as to produce, when the material is cooled, a rigid infrangible body.

In pressing the superimposed layers together, while under heat, desirably the material is first subjected to low pressure of substantially approximately twelve thousand pounds per square inch for a short period of time, the pressure then released, and the superimposed layers of material then subjected to a high pressure approximating twenty-five thousand pounds per square inch.

The superimposed impregnated layers may be compressed into flat sheets or blocks, or may be molded to any desired form. Pressure may be applied at right angles to the plane of the sheets or in angular relation thereto as the superimposed impregnated sheets are of sufficient flexibility, and when under pressure are capable of sufficient relative movement, to permit the laminations to conform to the contour of a mold.

In the production of the material blocks of the superimposed layers, of such thickness as to produce the desired thickness of wall or walls of the completed article, may be placed in molds and pressure applied to the relatively movable members of the mold to form articles of any desired contour. Where articles are molded in this manner the superimposed layers or sections of superimposed layers may be superimposed edgewise and the pressure applied at the ends of the layers to compact them. In this manner rings, gaskets, and tubular forms of various contour may be readily constructed.

More specifically the process of manufacturing the insulation, forming the subject matter of this invention, comprises mixing the ingredients successively in approximately the following proportions: Ground smoked sheet rubber 12 pounds 8 ounces; medium ground para rubber 7 pounds 8 ounces; these being mixed preferably in a suitable mill for a period of thirty-five minutes, more or less. To this mixture of rubber is added gradually carbon black 4 ounces and paraffin 8 ounces for approximately three minutes. A suitable heat-resistant material, preferably approximately 34 pounds of Barytes is then gradually mixed into the composition for a period of six minutes; 8 pounds of lime may then be added gradually and mixed for a period of two minutes. The material is then cooled and after the cooling is again subjected to the mixing operation at which time approximately 16 pounds of sulphur is added. The material desirably is mixed in a usual type of mixing mill and is then cut from the rolls of the mill in blocks or sheets of desired size for use. In the next step of the process the material thus produced is frictioned into a suitable woven fabric, preferably seven to eleven ounce duck, in such a manner that the material completely fills the interstices of the fabric, the composition preferably being fed into the calender upon one side of the fabric and at the required rate to produce the desired impregnation of the fabric.

The sheets of impregnated material are then superimposed with the warps of adjacent layers preferably extending in angular relation to each other, such as 30 or 45-degrees and a sufficient number of sheets thus superimposed to provide the desired thickness of the article to be made. The material is then placed in a suitable mold and subjected to hydraulic pressure in the presence of heat. Preferably the material is first subjected for a short time to a low pressure of approximately twelve thousand pounds per square inch; the press then released for a short time, and a high pressure of twenty-five thousand pounds or more then applied, and the material permitted to cure at about 320-degrees Fahrenheit for a period of approximately one hour. The article is then removed from the mold and the mold coated with liquid paraffin. The molded material when trimmed is then in condition for use.

Any suitable apparatus may be employed for performing the process above described. Suitable mechanism is illustrated in the accompanying drawing, in which, Fig. 1 is a view in transverse vertical section of a mixing mill;

Fig. 2 is a view in transverse vertical section of the calender showing the material being frictioned into the fabric;

Fig. 3 is a conventional illustration of an hydraulic press;

Fig. 4 is a transverse sectional view of a mold adapted to produce insulation for the adjacent ends of rails of an electric railway;

Fig. 5 is a perspective view of adjacent ends of two rails to which the insulation is applied; and, Fig. 6 is a perspective view of a block of insulation, certain of the layers being broken away in section to indicate the manner in which the warps, and consequently the wefts, of the adjacent layers are disposed in angular relation to each other.

The mixing mill illustrated in Fig. 1 is of the conventional form comprising a frame 1 in which pairs of cylindrical hollow rolls 2 and 3 are mounted in bearings, one of which is capable of adjustment by means of a screw 4 which permits the rolls to be adjusted relatively to each other. Heat is supplied to the rolls by steam or other suitable means. Ground smoked sheet rubber and para rubber are gradually fed into the bite of these rolls and mixed for a period of approximately thirty-five minutes. The paraffin and carbon black may then be gradually fed into the mixture as it is worked by the mixing rolls for a period of three minutes. Barytes in powdered form is then gradually introduced and mixed for a period of six minutes. Lime in powdered form is then gradually introduced into the mill for a period of two minutes. (If the mill is hot the batch is cut off, the mill cooled, the batch then returned.) Sulphur in powdered form is then gradually introduced and mixed thoroughly for a period of approximately five minutes, these materials being supplied in the approximate proportions above specified. The mixed stock or material is then removed from the mill in small batches, the removal being performed by inserting a knife into the material in the mill during the rotation of the rolls and stripping off a mass of the desired size.

The mass or sheet of material is then frictioned into preferably one side of a sheet of fabric, such as duck. This is accomplished by the usual calender comprising a frame 5 having an upper roll 6, an intermediate roll 7, and a lower roll 8 which are adjustable relatively to each other, said rolls being hollow and supplied with steam or other suitable source of heat. A sheet of duck 9 is fed into the bite of the rolls 6 and 7 and runs around the roll 7 between the rolls 7 and 8. The sheet 10, or mass of composition, is fed into the bite of the rolls 6 and 7 upon the sheet 9 and is frictioned in by the greater speed of revolution of the roll 6 than that of the roll 7 in such a manner as completely to fill and compact the composition into the interstices of the fabric and the interstices between the fibres thereof without substantially increasing the thickness of the sheet.

A suitable number of the layers of the composition are then superimposed upon each other, preferably with the warps of adjacent sheets 11 and 12 extending in angular relation to each other, as illustrated in Fig. 6. Any desired number of sheets may thus be superimposed and then cut to a suitable size and introduced into a press or into a mold which in turn is placed in a press.

In Fig. 4 a suitable mold is illustrated for producing the insulation for adjacent ends of a railroad rail. The superimposed sheets of material 13 are introduced between the lower member 14 and the upper member 15 of the mold, these mold members being made of iron and provided with suitable dowel pins 16 and 17 and complementary sockets therefor.

As illustrated herein several such molds are then introduced into an hydraulic press, as illustrated in Fig. 3, and pressure applied. The press illustrated comprises a hollow base 18 having a cylindrical chamber 19 in which a piston 20 is reciprocably mounted, the piston rod 21, which desirably is integral with the piston, extending through the upper wall of the base and engaging the lower presser plate 22 the ends of which are reciprocably mounted upon vertical columns 23 preferably located adjacent the corners of the press. An upper plate or beam 24 is rigidly secured to the columns and is provided with a preferably integral upper plate 25 adapted to engage the upper face of the topmost mold. Fluid under pressure is introduced into the cylinder through a pipe 26. Steam pipes 27 and 28, leading into and out of the lower presser plates 22, and similar steam pipes 29 and 30, leading into and out of the upper presser plate, provide means for supplying heat to such plates from which it is conducted through the molds to the material within the mold.

The molds as above stated are first subjected to a low pressure of approximately twelve thousand pounds per square inch for a short period of time, the pressure then released, and high pressure thereafter applied and permitted to continue for such time as may be required thoroughly to vulcanize and cure the material, the heat preferably being maintained at approximately 320-degrees Fahrenheit. The molds are then removed from the press and the articles removed from the molds and trimmed. The finished insulation 31, formed in the mold illustrated in Fig. 3, is shown in Fig. 5 as applied to the joint between adjacent ends of a railroad rail, a block 32 of similar insulation being interposed between the ends of the adjacent rail. The usual fish plates may then be clamped upon the rail by the bolts 33 the shanks of which are insulated from the rails through which they pass preferably by like material.

The insulation made in accordance with the process heretofore described is very hard, rigid and infrangible. It is waterproof and is so resistant to acids or alkalis that it can be submerged in either for a long period of time without deterioration. It is of high insulation value electrically and also is an effective non-conductor of heat. It is not subject to substantial contraction or expansion as a result of a change in temperature and is durable when subjected to wear. It is an effective insulation for high voltage electric currents and particularly where such insulation is required in apparatus which is subject to shock, vibration and wear, and where the insulation is exposed to rain or to the action of acids or alkalis.

The completed article consists of a thickness of vulcanized composition, substantially completely filled with the fabric layers which by reason of their original limited thickness are substantially in contact with each other, or very closely adjacent.

It will be understood that the formula above specified is that which is found to be most successful, but that such changes in proportions may be made as may be required by virtue of varying qualities of the ingredients or to provide a proper composition for the purpose specified and that such variations in the sequence of the steps of the process may be made as may be within the knowledge of those skilled in the art without departing from the scope and meaning of the following claims.

Having thus described the invention, what is claimed as new, and desired to be secured by Letters Patent, is:

1. A waterproof electric and heat insulating material resistant to acids and alkalis comprising a sheet or block formed of numerous relatively thin superimposed layers of woven fabric having the interstices of the fabric and of the fibres thereof completely filled with a compacted, heat-resistant rubber composition comprising major portions of rubber and Barytes, and minor portions of lime, paraffin, and carbon black, and the layers thereof cohesively united, compacted and vulcanized to provide a hard, rigid, infrangible body.

2. A waterproof electric and heat insulating material resistant to acids and alkalis comprising a sheet or block formed of numerous relatively thin superimposed layers of woven fabric having the interstices of the fabric and of the fibres thereof completely filled with a rubber composition comprising the following ingredients in substantially the following proportions:—

Smoked sheet rubber, ground  12 pounds 8 ounces
Medium para, ground  7 pounds 8 ounces
Lime  8 pounds
Carbon black  4 ounces
Sulphur  16 pounds
Barytes  34 pounds
Paraffin  8 ounces said layers being cohesively united, highly compacted, and vulcanized to provide a hard, rigid, substantially inflexible body.

3. The process of producing insulation which comprises homogeneously mixing into rubber, while subjected to heat and in succession, a mineral wax, a heat-resistant filler, lime and sulphur to provide a vulcanizable plastic composition, frictioning said composition into one side of a sheet of heavy woven fabric to fill completely the interstices of the fabric and of the fibres thereof without increasing the thickness of the sheet, superimposing a plurality of layers of said impregnated fabric, subjecting the superimposed layers to high pressure in the presence of heat to cause said impregnated layers to be cohesively compacted to produce a rigid infrangible body.

4. A waterproof electric and heat insulating material resistant to acids and alkalis comprising a laminated sheet or block formed of numerous, relatively thin superimposed layers of fabric, substantially all of said layers being in direct contact with each other and having the interstices of the fabric and of the fibres thereof completely filled with a highly compacted, heat-resistant rubber compostion, and said layers being cohesively united by said composition, compacted, and vulcanized to provide a hard, substantially infrangible body.

5. A waterproof electric and heat insulating material, resistant to acids and alkalis, comprising a sheet or laminated block formed of numerous, relatively thin, superimposed layers of woven fabric, substantially all of said layers being in direct contact with each other and having the interstices of the fabric and of the fibres thereof completely filled with a highly-compacted, heat-resistant rubber composition, said laminated sheet or block being molded to a desired form, and the layers thereof being cohesively united by said composition, compacted, and vulcanized to provide a hard, rigid, and substantially infrangible article.

6. The process of producing insulation, which comprises homogeneous mixing into rubber while subjected to heat, a heat-resistant filler, and a vulcanizing agent, frictioning the thoroughly mixed composition into one side of a sheet of woven fabric under heat and pressure at a rate sufficient to completely fill and compact the composition into the interstices of the fabric, without increasing the thickness of the impregnated sheet, superimposing numerous layers of the completely impregnated fabric, subjecting the superimposed layers to sufficiently high pressure in the presence of vulcanizing heat to cause the impregnated layers to be cohesively compacted and vulcanized to produce a rigid, substantially inflexible, infrangible body.

FRANK W. JACKSON.